United States Patent [19]

Lin

[11] Patent Number: 4,697,188

[45] Date of Patent: Sep. 29, 1987

[54] INTERFERENCE CANCELER WITH DIFFERENCE BEAM

[75] Inventor: Heng-Cheng Lin, North Andover, Mass.

[73] Assignee: American Telephone and Telegraph Company, AT&T Bell Laboratories, Murray Hill, N.J.

[21] Appl. No.: 701,351

[22] Filed: Feb. 13, 1985

[51] Int. Cl.$^4$ .................... G01S 3/16; H04R 7/185
[52] U.S. Cl. ............................ 342/383; 342/384; 342/358
[58] Field of Search ............... 343/379, 380, 381, 382, 343/383, 384, 358

[56] References Cited

U.S. PATENT DOCUMENTS

| | | |
|---|---|---|
| 3,167,761 | 1/1965 | Le Parquier . |
| 3,803,624 | 4/1974 | Kinsey . |
| 3,876,947 | 4/1975 | Giraudon ............................ 343/383 |
| 3,882,498 | 5/1975 | McGuffin ............................ 343/380 |
| 3,977,002 | 8/1976 | Barton ................................ 343/402 |
| 4,044,359 | 8/1977 | Applebaum et al. ............... 343/379 |
| 4,070,675 | 1/1978 | Daniel et al. ....................... 343/380 |
| 4,105,977 | 8/1978 | Fitting et al. ...................... 343/380 |
| 4,129,873 | 12/1978 | Kennedy ............................ 343/380 |
| 4,161,733 | 7/1979 | Piesiger ............................. 343/380 |
| 4,177,464 | 12/1979 | Masak . |
| 4,204,211 | 5/1980 | Cavelos ............................. 343/380 |
| 4,222,051 | 9/1980 | Kretschmer, Jr. et al. ........ 343/379 |
| 4,280,128 | 7/1981 | Masak ............................... 343/380 |
| 4,338,605 | 7/1982 | Mims . |
| 4,359,738 | 11/1982 | Lewis ................................ 343/379 |
| 4,425,567 | 1/1984 | Tresselt ............................. 343/373 |
| 4,503,434 | 3/1985 | Luh .................................. 343/373 |
| 4,516,126 | 5/1985 | Masak et al. ...................... 343/383 |
| 4,525,716 | 6/1985 | Carlin ............................... 343/381 |
| 4,571,594 | 2/1986 | Haupt ............................... 343/379 |

OTHER PUBLICATIONS

"Haves and Have Nots to Butt Heads at Space WARC", Microwaves & RF, Nov. 1984, pp. 33–38, by Michael Kachmar.

"2° Satellite Spacing: An FCC Challenge to Microwave Designers" by A. Chiaviella, Microwave Journal, Sep. 1983, pp. 36–44.

"Excitation of Higher-Order Antenna Modes by Multipath Propogation" by E. T. Harkless et al., IEEE Trans. on Communication Tech., Aug. 1967, pp. 597–603.

Primary Examiner—Theodore M. Blum
Assistant Examiner—D. Cain
Attorney, Agent, or Firm—Patrick E. Roberts; Robert O. Nimtz

[57] ABSTRACT

Undesired signals from interfering satellites are separated from desired signals from a target satellite by using a sum beam and a difference beam as in a monopulse radar. Both desired and undesired signals are received by an antenna and separated by different mode couplers from a waveguide. The fundamental mode of the waveguide provides the desired signals along with components from the interfering signals. Both desired and undesired signals are picked up from the waveguide through a fundamental mode coupler. The higher order modes of the waveguide provide the interfering signals alone, representing the difference beam which will be aligned along the boresight. In a circular waveguide, the TM$_{01}$° will yield a difference pattern for vertical polarization in any plane, and a TE$_{21}$° or TE$_{01}$° mode will result in a difference pattern for horizontal polarization. A square or a rectangular waveguide could be used instead of a circular waveguide to achieve the same result. The higher order mode signals are processed through a delay line and weighting circuit, also known as the least mean square loop, and then summed with the fundamental mode signals to derive the desired signals substantially free from undesired, interfering signals.

14 Claims, 6 Drawing Figures

INTERFERENCE CANCELER WITH DIFFERENCE BEAM

TECHNICAL FIELD

This invention relates to interference cancellation and, in particular, to cancellation of undesired signals from a satellite which interferes with desired signals from another satellite, the satellites not necessarily located at the same distance from the receiver.

BACKGROUND OF THE INVENTION

A recent effort in the technical community (for example, (1) a collection of papers presented at the AIAA 10th Communication Satellite Systems Conference, Orlando, Fla., March 1984 —and published under the same title by the AIAA, 1633 Broadway, New York, N.Y. 10019; (2) an article by A. Chiaviello entitled, "2° Satellite Spacing: An FCC Challenge to Microwave Designs", published in the September 1983 edition of the *Microwave Journal;* (3) an article by M. Kachmar entitled, "'Haves' and 'have nots' to butt heads at Space WARC", published in the November 1984 edition of the *Microwave & RF periodical* to reduce the geostationary satellite orbit separation from about 3.5 to 4 degrees down to as low as 2 degrees will effectively increase the number of satellites, thereby substantially increasing the total channel capacity for satellite communications. One critical technical problem incident to this effort is the interference between adjacent satellites operating in the same frequency spectrum and the same polarization. This has long been considered the main obstacle in reducing the geostationary satellite spacing.

One common way of countering the adjacent satellite interference is to use an interference canceler. In addition to the ordinary receiving apparatus (called main antenna sometimes), an interference canceler usually consists of a secondary (called auxiliary sometimes) antenna or feed and a network to generate a replica of the interfering signal. This is then used to subtract the interfering signal received by the main receiving apparatus such that the interfering signal is substantially cancelled at the output of the canceler.

One of the problems associated with the aforesaid technique is that an adaptive network is needed to combat the time-varying nature of the interfering signal. In addition, because the antenna patterns are frequency dependent, a frequency dependent cancellation network is necessary to perform wideband interference cancellation. Also, because the auxiliary feed, or the antenna, will receive both the interference signal and the desired signal, some method has to be adopted to separate them in performing the interference cancellation.

A known method of solving this last problem calls for inserting pilot tones in the interfering signal, which can then be used to identify the interfering signal and obtain the tap weights for adaptive cancellation. See, for example, CCIR Report 875, "A Survey of Interference Cancelers for Application in the Fixed Satellite Service" CCIR Recommendation & Report, Volume IV —Part I, 1982. Although the interfering signal is canceled, the desired signal is also degraded somewhat as will be disclosed more clearly in the detailed description of the present invention. It is desirable to obtain a better method, and apparatus to implement the method, for canceling the interfering signal by avoiding the aforesaid problem of degradation of the desired signal and to simplify the method for separating the desired signals and the interfering signals.

SUMMARY OF THE INVENTION

In accordance with the illustrative embodiment of the present invention, interference cancellation is obtained by separating desired signals from interfering signals for narrowband and/or wideband signals. This is achieved by an antenna voltage pattern comprising a sum beam, or main lobe, and a difference beam comprising an antenna pattern null on boresight. The desired signals received from the main satellite are picked up by the main lobe, or sum beam, of the antenna pattern but will not be picked up by the difference pattern because the null is on boresight. The undesired signals from the interfering satellite are picked up by the difference beam, processed by delay elements and tap weights and then used to cancel or substantially eliminate any component of the interfering signals which may have been picked up by the sum beam.

In accordance with a first embodiment of the present invention, higher order modes of a waveguide are used to separate the desired signals from interfering signals. The desired signals and the interfering signals are received in a waveguide either by placing the waveguide opening at the focus of a reflector antenna or by making one end of the waveguide, which may be flared, to receive the signals. The desired signals are recovered from the waveguide by a coupler of the fundamental mode. Due to the physical limitation of the apparatus, the signals picked up by the fundamental mode (hereinafter main signals) also have some components of the interfering signals. The interfering signals are recovered from the waveguide by a second coupler of a higher order mode. The interfering signals are then fed to delay elements and weighted and then summed with the aforesaid main signals to eliminate substantially the interfering signals.

In accordance with a second embodiment of the present invention two feed horns are located in the focal plane of a parabolic antenna but displaced on opposite sides of the focal point of the antenna so as to derive a sum beam and a difference beam, the null of the difference beam being located in the boresight. The two feed horns are terminated in a waveguide hybrid from which two feed lines are extracted. A first feed line which has the desired signals together with some components of the undesired signals is connected with a summing circuit. The second feed line which has only interfering signals is connected via a multitap network to the aforesaid summing circuit so that the interfering signals are canceled, leaving only the desired signals which are fed to a utilization means such as a modem.

An advantage of both embodiments of the present invention results in the use of only one antenna. Because only one antenna is used, and because the difference beam null is pointed along boresight there is no alignment problem as in the prior art when two or more antennas are used.

Another advantage is the automatic separation of the main signal from the interference signal without the cumbersome schemes of the prior art such as introduction of pilot tones and the like.

DETAILED DESCRIPTION

Figure 1:
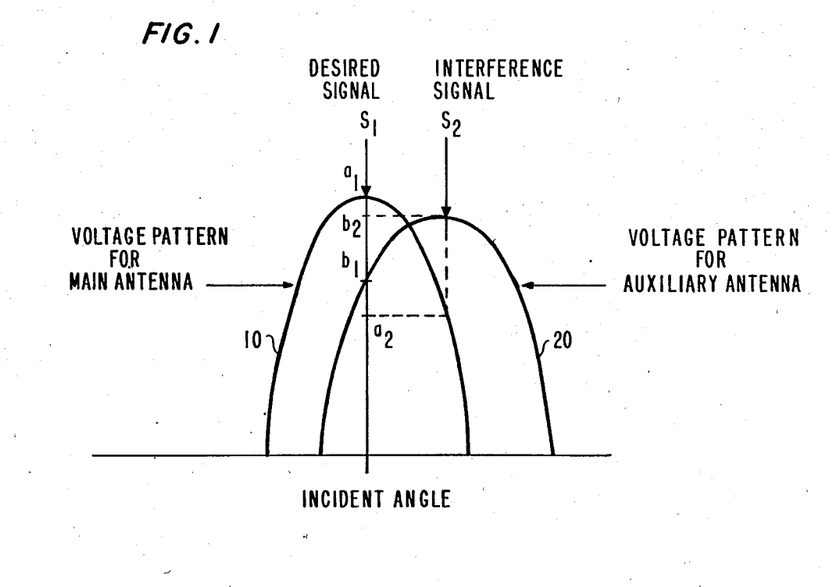
FIG. 1 shows the relationship between two antenna voltage patterns, useful in disclosing the theoretical basis of the present invention.

The theoretical basis of the prior art can be understood by referring to FIG. 1 wherein is shown the relationship of two antenna voltage patterns: signal pattern 10 for the main antenna and signal pattern 20 for the auxiliary antenna, feed horns, or multimode waveguide.

The signals received at the two antenna are:

$$s_m(\omega) = a_1 s_1(\omega) + a_2 s_2(\omega) \quad (1),$$

$$s_a(\omega) = b_1 s_1(\omega) e^{-j\tau_1} + b_2 s_2(\omega) e^{-j\tau_2} \quad (2).$$

where,
- f = signal frequency
- $\omega = 2\pi f$
- $s_1(\omega)$ = desired signal spectrum from a first satellite,
- $s_2(\omega)$ = interfering signal spectrum from adjacent, second satellite,
- $a_1$ and $a_2$ = complex numbers representing relative voltage gains of the main antenna towards the two satellites,
- $b_1$ and $b_2$ = complex numbers representing the relative voltage gains of the auxiliary antenna towards the two satellites,
- $s_m(\omega)$ = signal spectrum received at the main antenna,
- $s_a(\omega)$ = signal spectrum received at the auxiliary antenna,
- $\tau_1$ = time difference between the arrival of the first satellite signal at the main and auxiliary antennas,
- $\tau_2$ = time difference between the arrival of the interfering satellite signal at the main and auxiliary antennas.

In order to eliminate, or reduce the effect of, the interfering signal from the second satellite, a complex tap weight W is applied to the second signal, where $$W = -\frac{a_2}{b_2} e^{j\omega \tau_2}. \quad (3)$$

The combined output formed by adding the signal from the main antenna and the weighted signal from the auxiliary antenna is $$s_o(\omega) = s_m(\omega) + W s_a(\omega) \quad (4).$$

This becomes, after inserting the value of W from equation (3) and simplifying, $$s_o(\omega) = a_1 \left[ 1 - \frac{a_2 b_1}{a_1 b_2} e^{-j\omega(\tau_1 - \tau_2)} \right] s(\omega). \quad (5)$$

Although the undesired interfering signal is completely canceled, the desired signal from the main antenna suffers degradation which is caused by the second term in brackets in equation (5).

The discrimination ratio D is defined as $$D \triangleq \frac{a_2 b_1}{a_1 b_2} \quad (6)$$

$$= \frac{a_2/a_1}{b_2/b_1}.$$

The relative perturbation is small if, and only if, $|D|$ is small. To illustrate, assume the interfering signal $s_2$ falls into an angle where the antenna power pattern gain is 10 decibels below its peak, that is, $$\frac{|a_2|}{|a_1|} = 0.316. \quad (7)$$

If one uses a small horn antenna as an auxiliary element, then $$\frac{|b_1|}{|b_2|} \approx 1, \quad (8)$$

and $$|D| \approx 0.316. \quad (9)$$

This means, that the effect of the interfering signal affects the desired signal by more than thirty percent.

According to one solution, $$\frac{|b_1|}{|b_2|}$$

is made small, thereby reducing the magnitude of $|D|$. For instance, if the auxiliary element has the same discrimination as the main element, $$\frac{|b_1|}{|b_2|} = 0.316, \quad (10)$$

one can get:

$$|D| = 0.1 \quad (11).$$

This means, the effect of the interfering signal on the main signal is reduced to ten percent.

The effect on the desired signal occurs not only in amplitude but in phase as well, dependent on the values of $\tau_1$, $\tau_2$, which should be kept as small as possible. Because the antenna pattern is frequency dependent, $a_1$, $a_2$, $b_1$ and $b_2$ are actually frequency dependent. The resultant output signal can be very dispersive if $|D|$ is not kept small over the operating frequency range.

The aforesaid problem can be solved using the present invention by making $$|b_1| = 0 \quad (12),$$

thereby making D = 0.

This result can be achieved by the use of a single antenna and a waveguide because it is well known that different modes in waveguides produce different antenna patterns. By properly coupling the different modes into different output ports, separate signals each having a different antenna pattern may be obtained. Couplers are well known. For example, the type 49677 Coupler made by the Andrew Corporation may be used. The output ports for different waveguide modes behave as if there were different antennas. This eliminates the need for many antennas which are normally used in the prior art.

A benefit in using the difference beam to perform the cancellation of the undesired signals from interfering satellites is the simplification of the cancellation network. This is so because the second coupler provides only the undesired, interfering signals.

Because $b_1$ is made zero in equation (12), the aforesaid equation (2) reduces to $$s_o(\omega) = b_2 s_2(\omega) \quad (13).$$

Because $\tau_2 = 0$, the combined output of the desired and undesired signal will be $$s_o(\omega) = a_1 s_1(\omega) + (a_2 + W b_2) s_2(\omega) \quad (14).$$

The cancellation then becomes a minimization problem, namely, to minimize the power of $s_o(\omega)$ by adjusting the weighting factor W. For example, the conventional least mean square (LMS) algorithm, or its derivatives like perturbational (dither) algorithms, as shown in U.S. Pat. No. 4,320,535 issued Mar. 16, 1982 to D. M. Brady et al, or in the case of digital communications zero forcing algorithms as shown in the paper "Techniques for Adaptive Equalization of Digital Communication System" by R. W. Lucky, published in *Bell System Technical Journal* in February 1965, can be applied directly to obtain the appropriate weighting. This simplification removes the need for a somewhat more complicated bootstrap algorithm.

In practice, because the antenna pattern of each element is frequency dependent, the tap weight required for the total cancellation given in equation (3) has to be modified to $$W(\omega) = -\frac{a_2(\omega)}{b_2(\omega)} \quad (15)$$

For commercial satellite communications, the cancellation is only needed in a 500 MHz bandwidth (BW), the most effective tap spacing, T, for a multitap network is $$T = \frac{1}{BW} \quad (16)$$

= 2 nanoseconds.

For a digital communication system, the tap spacing is dictated by the symbol baud rate if a zero forcing algorithm is to be used.

The technique of this invention is particularly powerful when the interference falls into the main lobe of the main antenna pattern. In this case, the terms $a_2(\omega)$ and $b_2(\omega)$ are expected to be slow varying over the 500 MHz band when the method of this invention is employed as opposed to fast varying if the interference falls into the sidelobes as disclosed in the prior art. This phenomenon makes the frequency response of the required weight $W(\omega)$ smooth and the cancellation network easier to implement. For instance, when the term $W(\omega)$ is of the second order in the interested frequency band, a three tap network will be sufficient to yield the required wideband interference cancellation.

Like many other cancellation techniques, the cancellation of the present invention can be performed at intermediate frequency (IF), radio frequency (RF), or even at baseband.

Figure 2:
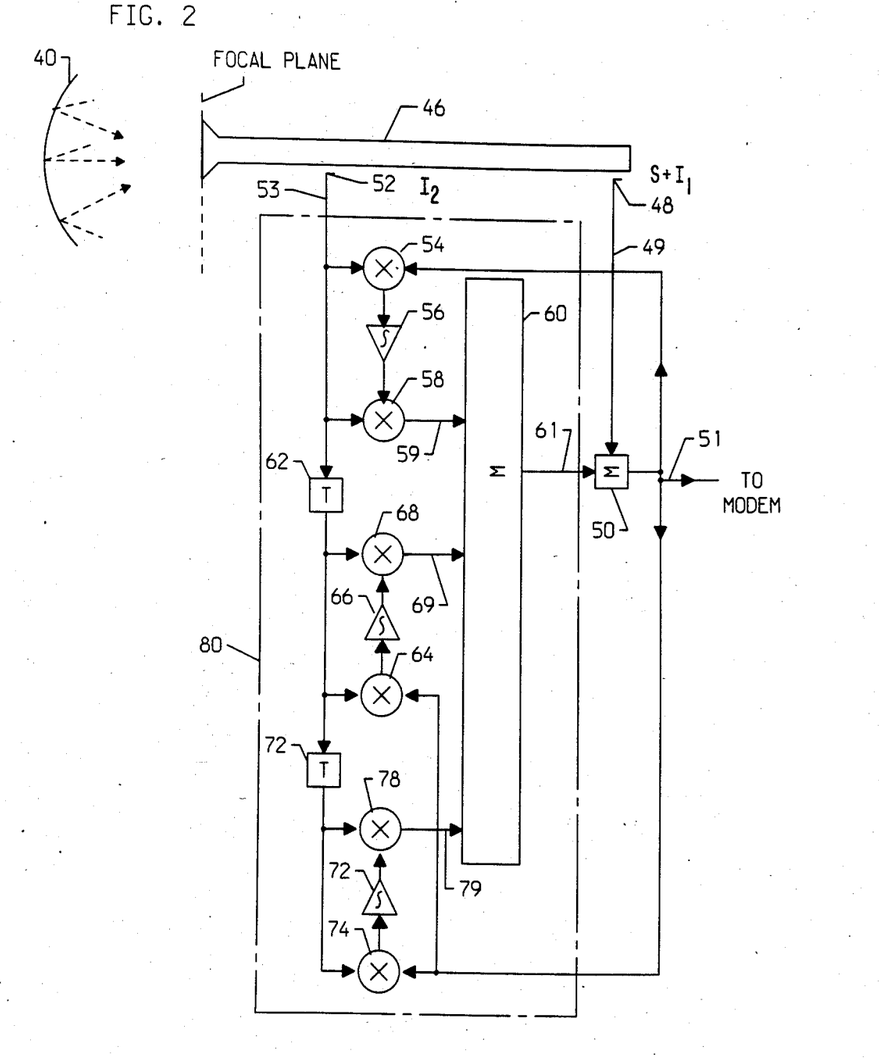
FIG. 2 shows the use of a multimode waveguide in conjunction with a single reflector antenna to separate desired signals from interfering signals.

Referring to FIG. 2, there is shown a reflector antenna 40 from which signals from satellites are reflected. The opening of waveguide 46 is located in the focal plane of antenna 40. The sum beam 41, shown in FIG. 3, picks up the desired signal S from a target satellite (not shown) along with signal components $I_1$ from interfering satellites (not shown). The difference lobes 43 and 45, also shown in FIG. 3, pick up interfering signals $I_2$ but negligible amount of the desired signals because the null of the difference lobes is pointed at the boresight.

Figure 3:
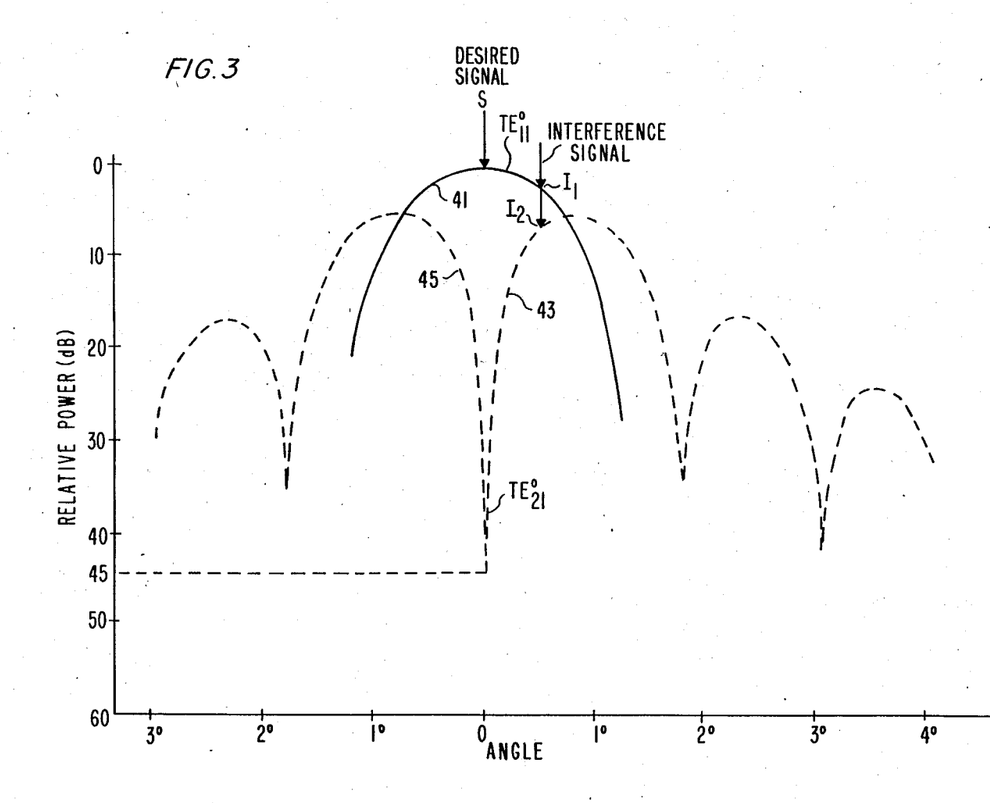
FIG. 3 shows the antenna voltage pattern for the embodiment of FIG. 2.

By way of coupling device 48, the desired signals S and the interfering signals $I_1$ are extracted from waveguide 46 and sent via path 49 to a summing circuit 50. The interfering signals $I_2$ are extracted from waveguide 46 via coupling means 52 and then processed by the method of least mean square error using the aforesaid desired signals S and component of interfering signals $I_1$ to eliminate the interfering signals and yield only the desired signals which are sent via path 51 to a utilization means such as a modem (not shown). In one embodiment, horizontally polarized antenna patterns for the dominant mode $TE_{11}^o$ for circular waveguide 46 and the next higher order mode $TM_{01}^o$ for circular waveguide 46 are measured in the plane where both satellites are located (satellite plane). These patterns are shown in FIG. 3 for the apparatus of FIG. 2. The $TE_{11}^o$ mode exhibits an antenna pattern whose horizontally polarized response peaks at the boresight; this is the sum beam to the described hereinbelow. The $TM_{01}^o$ mode, however, produces a pattern with a null at the boresight, referred to as a difference pattern.

This phenomenon can be explained by the field distribution in the aperture plane. For the horizontal polarization, the field contributions from the left and the right sides of the aperture will cancel each other completely at the boresight, thus generating a null in the center of the far field pattern.

The same phenomenon occurs for the vertical polarization pattern in the elevation plane. The $TM_{01}^o$ mode, however, only gives a difference pattern for the vertically polarized wave in the satellite plane. For a horizontally polarized signal, a $TE_{01}^o$ mode, or a $TE_{21}^o$ mode, will have to be used to obtain a difference pattern in the elevation plane.

A set of vertically polarized $TE_{11}^o$ and $TM_{01}^o$ signals may be used for vertical polarization transmission. Likewise, a set of horizontally polarized $TE_{11}^o$ and $TE_{01}^o$ signals may be used for horizontal polarization transmission. Alternatively, other higher order mode signals may be used.

The technique of utilizing fundamental and higher order modes in a circular waveguide to obtain a sum beam and a difference beam can be also extended to a rectangular or a square waveguide or even an elliptical waveguide. For instance, the fundamental mode $TE_{11}^o$ of a circular waveguide can be replaced by $TE_{10}^\square$ of a square or a rectangular waveguide. Likewise, or $TE_{01}^o$ or $TE_{21}^o$ can be replaced by $TE_{02}^\square$; $TM_{01}^o$ can be replaced by $TE_{11}^\square$ or $TM_{11}^\square$; and the like. The number of variations can be quite large, yet the basic principle remains the same: use of a higher order mode with a difference pattern for separating desired signals from interfering signals.

The difference antenna pattern, as used in the prior art, is usually referred to as the difference of two identical antenna patterns that are offset by a specific angle. Because it is the difference of two identical patterns, it exhibits an odd symmetry with respect to the center. That is, there is a null at the center of the pattern and peaks on opposite sides of the null. If antenna 40 of FIG. 2 is a parabolic reflector, the null will occur at the boresight for any odd order modes.

Figure 4:
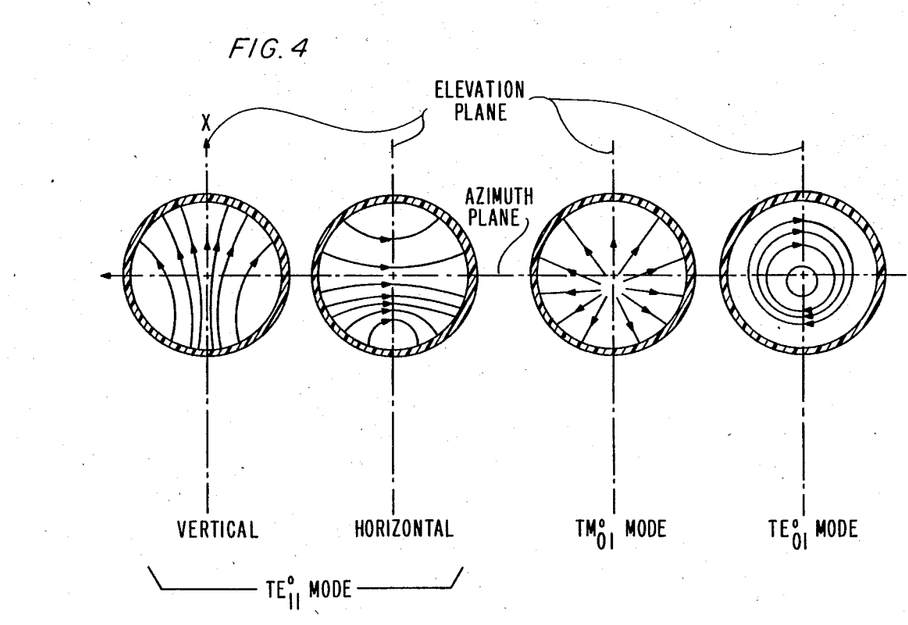
FIG. 4 shows the electric field lines in the aperture plane of an offset reflector antenna.

For an offset reflector antenna like the horn reflector, however, because the aperture field is not completely symmetrical with respect to the horizontal axis, the antenna pattern will not be odd symmetric with respect to the center of the elevation plane, as shown in FIG. 4. Nevertheless, there is still a null at the boresight for any odd order modes. This can be proved from the teaching of an article entitle, "The Electrical Characteristics of Conical Horn-Reflection Antenna," by Messrs. J. N. Hines et al in volume 42 of the *Bell System Technical Journal* (July 1963). As a matter of fact, because the aperture dimension of the horn reflector is much smaller than the focal length of the parabola, the antenna pattern is not very different from what it would be if the reflector center were placed right on the axis. The antenna patterns for the higher order modes are almost odd symmetric.

The interfering signal $I_2$ is sent via path 53 to a circuit 54 where the aforesaid interfering signal is multiplied with the output from summing circuit 50. The output from multiplying circuit 54 is integrated at circuit 56 and then sent to circuit 58 where it is multiplied with the interfering signal $I_1$. The output from multiplying circuit 58 is sent to summer 60. By these steps, tap weights are introduced. Alternatively, a dither algorithm which is described in the aforesaid Brady patent, or in the case of digital communication, the aforesaid zero forcing algorithm can be used to obtain the tap weights.

Delay is introduced by circuit 62 into the interfering signals $I_2$. Thereafter tap weights are introduced, as described hereinabove, by circuit components 64, 66 and 68. Likewise, another delay circuit 72 is introduced in the path of interfering signals $I_2$ before the introduction of tap weight by components 74, 76 and 78. The number of taps can be increased as needed by the system performance.

Thus after the introduction of delay elements and tap weights, the processed interference signals from the three paths 59, 69 and 79 are summed at circuit 60. The output signal from circuit 60 is summed with the aforesaid main signals S and interference signals $I_1$ at summing circuit 50 and the output therefrom is delivered via path 51 as stated hereinabove. Because of the feedback, the component of the interfering signals $I_1$ in the path of the desired signal S will be substantially eliminated to yield the desired signal S.

Figure 5:
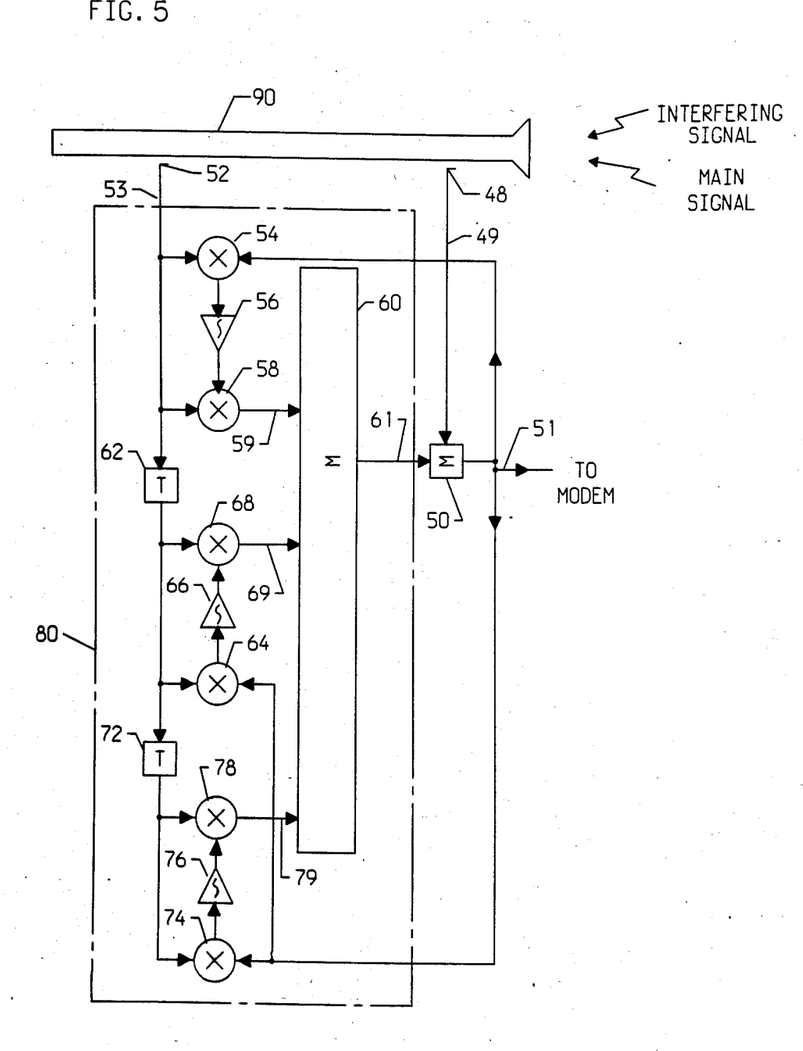
FIG. 5 shows the use of a multimode waveguide as an antenna element to separate desired signals from interfering signals.

A variation of the present invention is shown in FIG. 5. Instead of using the reflector antenna 40 of FIG. 2, the waveguide is directed at the target satellite. The waveguide opening is normally flared and serves as an antenna which is usually referred to as a horn antenna. The antenna voltage response pattern is similar to that shown in FIG. 3. The rest of the apparatus is substantially similar to that shown in FIG. 2 and is not being described herein.

Figure 6:
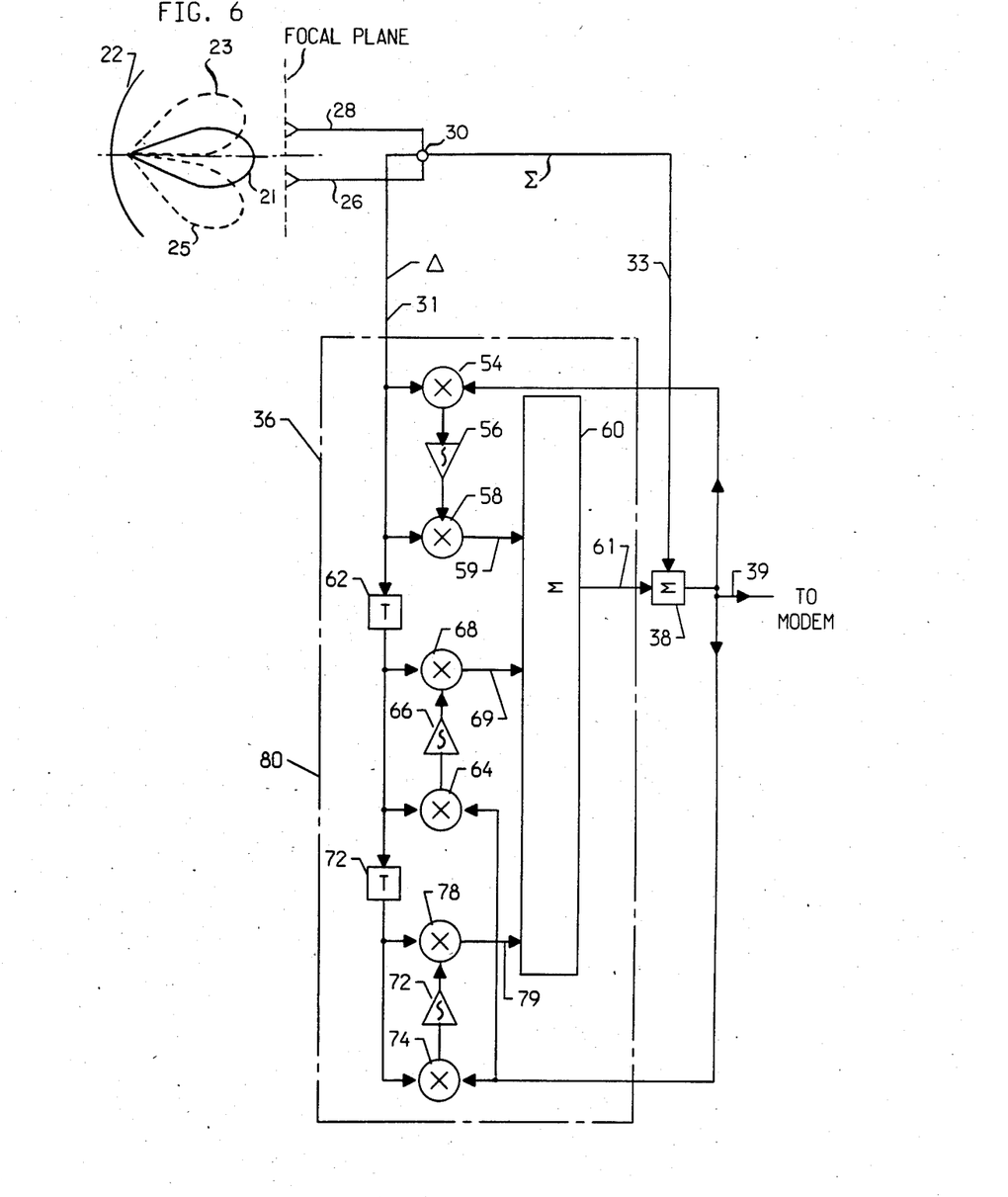
FIG. 6 shows the use of two feed horns to separate the desired signals and cancel the interfering signals.

Referring to FIG. 6, there is shown another embodiment for implementing the present invention. As in the field of mono-pulse radar, two feed horns are used. Here, feed horns 28 and 26 are located in the focal plane of parabolic, dish antenna 22. Feed horns 26 and 28 are located on opposite sides of the focal point of the dish antenna 22 in such a way that an antenna pattern comprising a sum beam 21 and difference beam having lobes 23 and 25 are formed. The null of the difference beam is on the boresight of antenna 22. This means the desired signals will not be picked up by the difference beam.

The two feed horns 26 and 28 are connected to a waveguide hybrid 30. From waveguide hybrid 30, feed line 33 carrying the sum beam having the desired signals along with some components of the undesired signals is terminated at summing circuit 38. Feed line 31 carrying only the undesired signals is connected via multitap network 36 to the aforesaid summing circuit 38. Multitap network 36 is substantially similar to the network 80 of FIG. 2 and is not repeated here. At summing circuit 38, the undesired signals will be canceled leaving the desired signals only.

A variation of the embodiment shown in FIG. 6 comprises the removal of reflector dish 22 and focuses the two feed horn antennas towards the satellite. The antenna voltage response patterns are similar to those shown in FIG. 3. The rest of the apparatus is identical to that shown in FIG. 6 and is not described herein.

What is claimed is:

1. Apparatus for separating desired signals from a target satellite from undesired signals from interfering satellites said apparatus comprising
   an antenna for reflecting to its focus said desired signals and said undesired signals,
   a waveguide with one of its ends located at the focus of said antenna, a first coupler for extracting the fundamental mode signals from said waveguide and delivering said signals to a first summing circuit,
   a second coupler for extracting higher order mode signals from said waveguide and delivering said higher order mode signals to a delay line network, the output from said delay line network being delivered to said first summing circuit, and said first summing circuit adding said fundamental mode signals from said first coupler and said higher order mode signals from said second coupler to derive said desired signals which are substantially free from said undesired signals.

2. The apparatus of claim 1 wherein said delay line network comprises first, second and third sub-circuits, each of said sub-circuits comprising a first combining element having first and second inputs, said second input being obtained from the output from said first summing circuit, an integrator having as its input the output from said first combining element, and a second combining element having third and fourth inputs and an output connected to a second summing circuit, said third input being the output from said integrator.

3. The delay line network of claim 2 wherein said first input to said first combining element and said fourth input to said second combining element are obtained from said second coupler.

4. The delay line network of claim 2 wherein the output from said second coupler is delivered via a first delay element to the first input of said first combining element and fourth input of said second combining element of said second sub-circuit.

5. The delay line network of claim 4 further comprising the output from said first delay element being delivered via a second delay element to the first input of said first combining element and the fourth input of said third sub-circuit.

6. Apparatus for separating desired signals which are received from a target satellite from undesired signals which are received from interfering satellites said apparatus comprising
an antenna for reflecting said desired signals and said undesired signals to the focal plane of said antenna,
first and second feed horns located in said focal plane for receiving and feeding said desired signals and said undesired signals to a waveguide hybrid,
first and second feed lines for separating said signals, said first feed line terminating in a first summing circuit, said second feed line being connected via a multitap network to said first summing circuit to eliminate substantially said undesired signals.

7. The apparatus of claim 6 wherein said multitap network comprises first, second and third sub-circuits, each of said sub-circuits comprising a first combining element having first and second inputs, said second input being obtained from the output from said first summing circuit, an integrator having as its input the output from said first combining element, and a second combining element having third and fourth inputs and an output connected to a second summing circuit, said third input being the output from said integrator.

8. The multitap network of claim 7 wherein said first input to said first combining element and said fourth input to said second combining element are obtained from said second coupler.

9. The multitap network of claim 7 wherein the output from said second coupler is delivered via a first delay element to the first input of said first combining element and fourth input of said second combining element of said second sub-circuit.

10. The multitap network of claim 9 further comprising the output from said first delay element being delivered via a second delay element to the first input of said first combining element and the fourth input of said third sub-circuit.

11. Apparatus for separating desired signals from a target satellite from undesired signals from interfering satellites said apparatus comprising
a waveguide having an open end for receiving said desired signals and said undesired signals,
a first coupler for extracting the fundamental mode signals from said waveguide and delivering said signal to a first summing circuit,
a second coupler for extracting higher order mode signals from said waveguide and delivering said higher order mode signals to a delay line network, the output from said delay line network being delivered to said first summing circuit, and said first summing circuit adding said fundamental mode signals from said first coupler and said higher order mode signals from said second coupler to derive said desired signals which is substantially free from said undesired signals.

12. The apparatus of claim 11 wherein said multitap network comprises a plurality of sub-circuits, each of said sub-circuits comprising a first combining element having first and second inputs, said second input being obtained from the output from said first summing circuit, an integrator having as its input the output from said first combining element, and a second combining element having third and fourth inputs and an output connected to a second summing circuit, said third input being the output from said integrator.

13. The multitap network of claim 12 wherein said first input to said first combining element and said fourth input to said second combining element are obtained from said second feed line.

14. The multitap network of claim 12 wherein the output from said second feed line is delivered via a delay element to the first input of said first combining element and fourth input of said second combining element of each of said sub-circuits beyond the first one of said sub-circuits.

* * * * *